United States Patent
Newman et al.

(10) Patent No.: US 12,170,099 B2
(45) Date of Patent: Dec. 17, 2024

(54) SYSTEMS, APPARATUS, AND METHODS FOR ENCODING TELEMETRY DATA AS AUDIO WAVEFORMS

(71) Applicant: GoPro, Inc., San Mateo, CA (US)

(72) Inventors: David Newman, San Diego, CA (US); Robert McIntosh, Marina Del Rey, CA (US)

(73) Assignee: GoPro, Inc., San Mateo, CA (US)

(*) Notice: Subject to any disclaimer, the term of this patent is extended or adjusted under 35 U.S.C. 154(b) by 22 days.

(21) Appl. No.: 17/805,180

(22) Filed: Jun. 2, 2022

(65) Prior Publication Data
US 2023/0245688 A1 Aug. 3, 2023

Related U.S. Application Data

(60) Provisional application No. 63/267,292, filed on Jan. 28, 2022.

(51) Int. Cl.
| | | |
|---|---|---|
| *G06F 3/16* | (2006.01) | |
| *G06F 5/00* | (2006.01) | |
| *G06F 7/00* | (2006.01) | |
| *G11B 27/031* | (2006.01) | |
| *G11B 27/10* | (2006.01) | |

(52) U.S. Cl.
CPC ............ *G11B 27/10* (2013.01); *G06F 3/162* (2013.01); *G11B 27/031* (2013.01)

(58) Field of Classification Search
CPC ..... G06F 3/16; G06F 5/00; G06F 7/00; G06F 11/00; G11B 27/031; G11B 27/10; G11B 15/00; G11B 11/00; G11B 9/00; G11B 23/00
USPC ............ 386/227, 239, 248, 314, 326
See application file for complete search history.

(56) References Cited

U.S. PATENT DOCUMENTS

| | | | |
|---|---|---|---|
| 6,061,408 A * | 5/2000 | Achour | H04L 27/18 375/280 |
| 9,681,111 B1 | 6/2017 | Newman | |
| 10,681,311 B1 * | 6/2020 | Gottman | G06Q 50/22 |
| 2006/0109933 A1 * | 5/2006 | Lee | H04L 25/4915 375/308 |
| 2007/0258707 A1 | 11/2007 | Raskar | |
| 2008/0253685 A1 | 10/2008 | Kuranov | |
| 2009/0157746 A1 * | 6/2009 | More | G06Q 10/06 |
| 2014/0072056 A1 * | 3/2014 | Fay | H03M 13/6519 375/E7.027 |

(Continued)

*Primary Examiner* — Daquan Zhao
(74) *Attorney, Agent, or Firm* — Wang Hardoon, P.C.

(57) ABSTRACT

Systems, apparatus, and methods for encoding telemetry data as audio waveforms. Action cameras may be used to capture telemetry data, which in some applications, may be more useful than its audio/visual media capture. For example, a user may desire the "look-and-feel" of one camera but would like to use the telemetry track information from an action camera. In so-called "piggybacking" operation, the user may rigidly affix the two cameras and use the video track with the telemetry track in post-processing. Unfortunately, time-aligning the two tracks can result in relative drift over time. Various embodiments of the present disclosure transfer telemetry data as data-over-audio. The data-over-audio may be sampled according to the recipient device and recorded at capture. Subsequent post-processing may be performed with the time-aligned tracks.

19 Claims, 10 Drawing Sheets

(56) References Cited

U.S. PATENT DOCUMENTS

| | | |
|---|---|---|
| 2015/0341536 A1 | 11/2015 | Huang |
| 2022/0030177 A1 | 1/2022 | Newman |
| 2023/0109047 A1 | 4/2023 | Stimm |
| 2023/0144635 A1 | 5/2023 | Newman |
| 2023/0247292 A1 | 8/2023 | Stimm |

* cited by examiner

SYSTEMS, APPARATUS, AND METHODS FOR ENCODING TELEMETRY DATA AS AUDIO WAVEFORMS

PRIORITY

This application claims the benefit of priority to U.S. Provisional Patent Application No. 63/267,292 entitled "SYSTEMS, APPARATUS, AND METHODS FOR ENCODING TELEMETRY DATA AS AUDIO WAVEFORMS" filed Jan. 28, 2022, the contents of which are incorporated herein by reference in its entirety.

RELATED APPLICATIONS

This application is generally related to the subject matter of U.S. patent application Ser. No. 17/449,713 entitled "METHODS AND APPARATUS FOR RE-STABILIZING VIDEO IN POST-PROCESSING" filed Oct. 1, 2021, and U.S. patent application Ser. No. 16/934,628 entitled "METHODS AND APPARATUS FOR METADATA-BASED PROCESSING OF MEDIA CONTENT" filed Jul. 21, 2020, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of action photography. More particularly, the present disclosure relates to systems, computer programs, devices, and methods for capturing and encoding telemetry data for use with multimedia files.

DESCRIPTION OF RELATED TECHNOLOGY

In traditional cinematography, raw footage is framed and shot under controlled circumstances. During post-processing and editing, shots are selected and assembled into scenes; scenes may be further augmented with production effects (visual and audio effects). The nearly ubiquitous availability of high-quality media has cultivated consumer tastes for high production value content; this often entails specialized equipment (camera dollies, stabilization rigs) and/or sophisticated editing techniques (e.g., sound effects, artistic visualizations, etc.).

Action cameras are a relatively recent phenomenon. Unlike traditional photography, action cameras are typically designed to capture immersive footage (e.g., 360° panoramic content). For a variety of reasons, action cameras are typically compact, ruggedized, and designed to require minimal interaction once recording has begun. In most situations, the action camera user cannot control shooting conditions; interesting moments fleetingly occur and often cannot be replicated. As a result, content generated by action cameras often require significant editing; a lot of raw footage may be uninteresting (e.g., the user may be waiting for action to happen), and shots may need to be re-framed (e.g., were captured off-center, etc.).

Effective cinematography conveys storyline, emotion, excitement, etc. While there are important differences between traditional and action camera footage, ultimately consumers often want the ability to achieve at least some cinema-like production values with their action cameras.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Audio/Visual Tracks and Post-Processing

Figure 1:
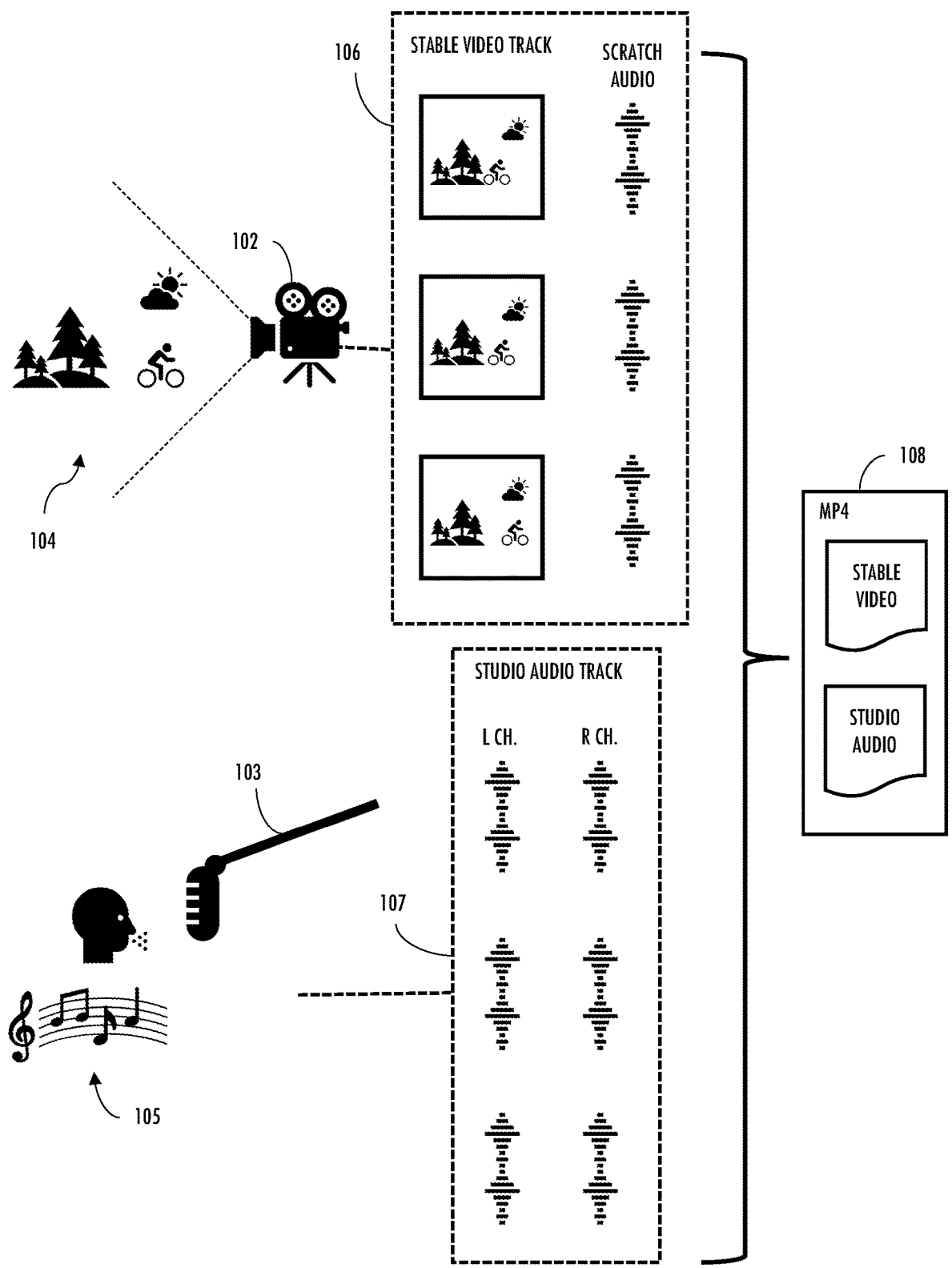
FIG. 1 a graphical representation of a cinematic video camera capturing footage, useful to illustrate various aspects of the present disclosure.

FIG. 1 is a graphical representation of a cinematic video camera capturing footage, useful to illustrate various aspects of the present disclosure. As shown, the video camera 102 captures a subject 104. However, unlike handheld cameras, cinematic cameras are typically mounted on stabilizing apparatus (e.g., fixed tripods, camera dollies, camera trucks, stabilizing gimbals, etc.). Additionally, most directors use separate boom microphones 103 to capture audio 105; in some cases, audio may be captured separately from video (e.g., in a sound studio.)

Isolating the capture of video from audio, maximizes the director's flexibility. For example, in this case the director can capture a stable video track with scratch audio (media file 106). Separately, musical scoring, sound effects, and/or dialogue can be recorded under carefully controlled studio conditions (studio audio track 107). Later the stable video track and studio audio track can be spliced together in "post" (i.e., after capture/recording) to create a resulting media track 108. In some cases, the video and audio tracks from multiple different "takes" can be re-arranged, composited, and/or mixed; this enables a director to select the best scenes to tell the story narrative. The flexibility of post-processing greatly affects the resulting video and audio tracks; high image quality, cohesive narrative, and crisp audio are the hallmark of cinema quality media.

Figure 2:
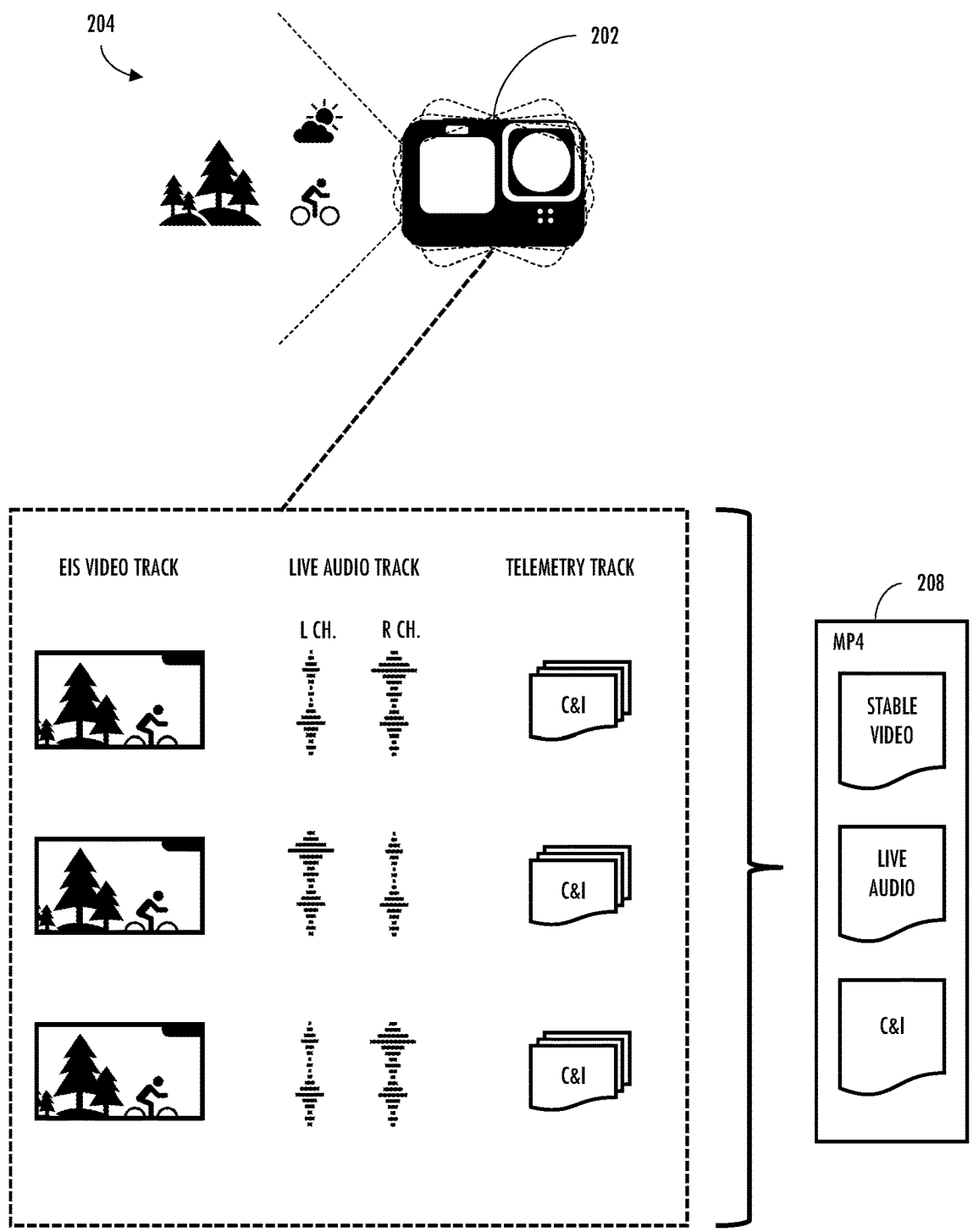
FIG. 2 is a graphical representation of an action camera capturing footage, useful to illustrate various aspects of the present disclosure.

FIG. 2 is a graphical representation of an action camera capturing footage, useful to illustrate various aspects of the present disclosure. As shown, the action camera 202 captures a subject 204. Live audio may be captured by directional microphones that are mounted to the chassis of the action camera. Even though the action camera is handheld and shaky, the action camera stabilizes the resulting video based on sensed telemetry data. Specifically, in-camera Electronic Image Stabilization (EIS) uses sensor data (e.g., gyroscope) to determine the movement of the capture device. Then, each frame of video is rotated (tilted) and/or translated (panned) to counteract the sensed motion. In-camera EIS greatly reduces apparent motion caused by camera shake and frame-to-frame jitter. As used herein, the term "apparent motion" refers to the illusion of an object's motion caused by the relative motion between the capture device and the object. The stable video and live audio are encoded into a media file 208 (e.g., an MPEG-4 audio/visual file).

In some variants, in-camera stabilization metadata may be included in the media file 208 to enable subsequent post-processing. Post-processing may improve, enlarge, and/or modify the stabilized video. Such techniques are described in U.S. patent application Ser. No. 17/449,713 entitled "METHODS AND APPARATUS FOR RE-STABILIZING VIDEO IN POST-PROCESSING" filed Oct. 1, 2021, previously incorporated herein by reference in its entirety. As described therein, previously stabilized video can be reconstructed and re-stabilized to provide for improved stabilization (e.g., a wider crop, etc.) For example, camera-aware post-processing can reuse portions of the in-camera stabilized videos while providing additional benefits (e.g., the ability to regenerate the original captured videos in post-production and re-stabilize the videos). Camera-aware post-processing can also improve orientation metadata and remove sensor error.

Figure 3:
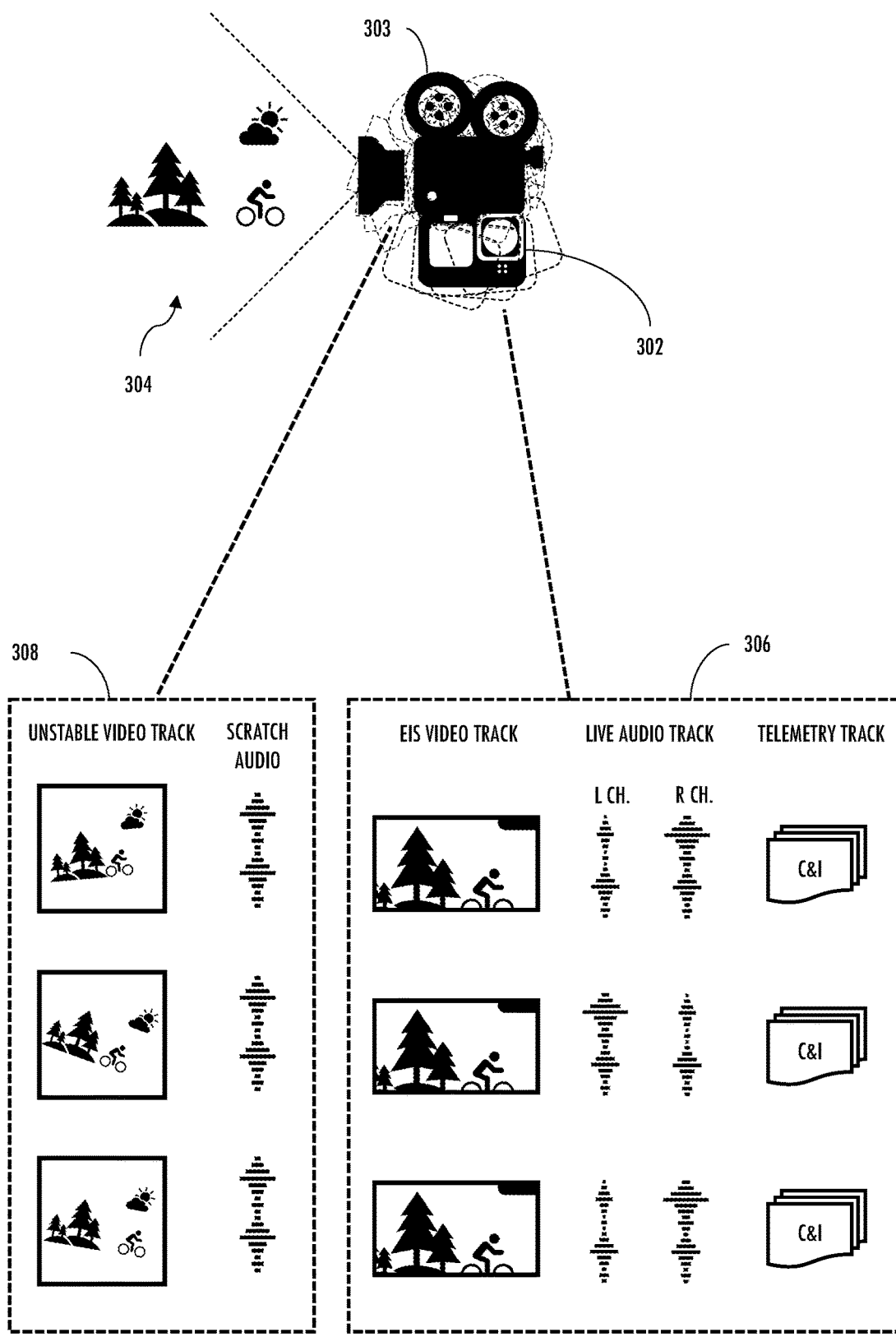
FIG. 3 is a graphical representation of a "piggybacking" configuration, useful to illustrate various aspects of the present disclosure.

In some applications, the telemetry data that can be captured with action cameras may be more useful than its audio/visual media capture. For example, as shown in FIG. 3, an action camera 302 is rigidly attached to another camera (e.g., a cinematic video camera 303); this "piggybacking" configuration may be used where the user wants the telemetry track information from the action camera but also desires the "look-and-feel" or other shooting capabilities of a specific camera. Notably, the telemetry track information can be used in post-processing to enable metadata-based cinematography, production effects, shot selection, and/or other content augmentation. Such techniques are described in U.S. patent application Ser. No. 16/934,628 entitled "METHODS AND APPARATUS FOR METADATA-BASED PROCESSING OF MEDIA CONTENT" filed Jul. 21, 2020, previously incorporated herein by reference in its entirety. The various techniques described therein leverage the camera's actual experiential data to enable cinema-quality post-processing for the general consuming public. Instantaneous metadata-based cinematography and shot selection advisories and architectures are also described.

As shown, the action camera 302 and cinematic video camera 303 both capture the same scene 304. In this configuration, the action camera captures a media data structure 306 that includes an EIS video track, live audio, and telemetry data; the cinematic video camera 303 captures a media data structure 308 with an unstable video track and scratch audio. Ideally, the user can post-process the unstable video track using the EIS metadata (e.g., telemetry data) to get their desired video footage and/or to mix in audio effects, time synchronize other aesthetically pleasing effects, etc.

Figure 4:
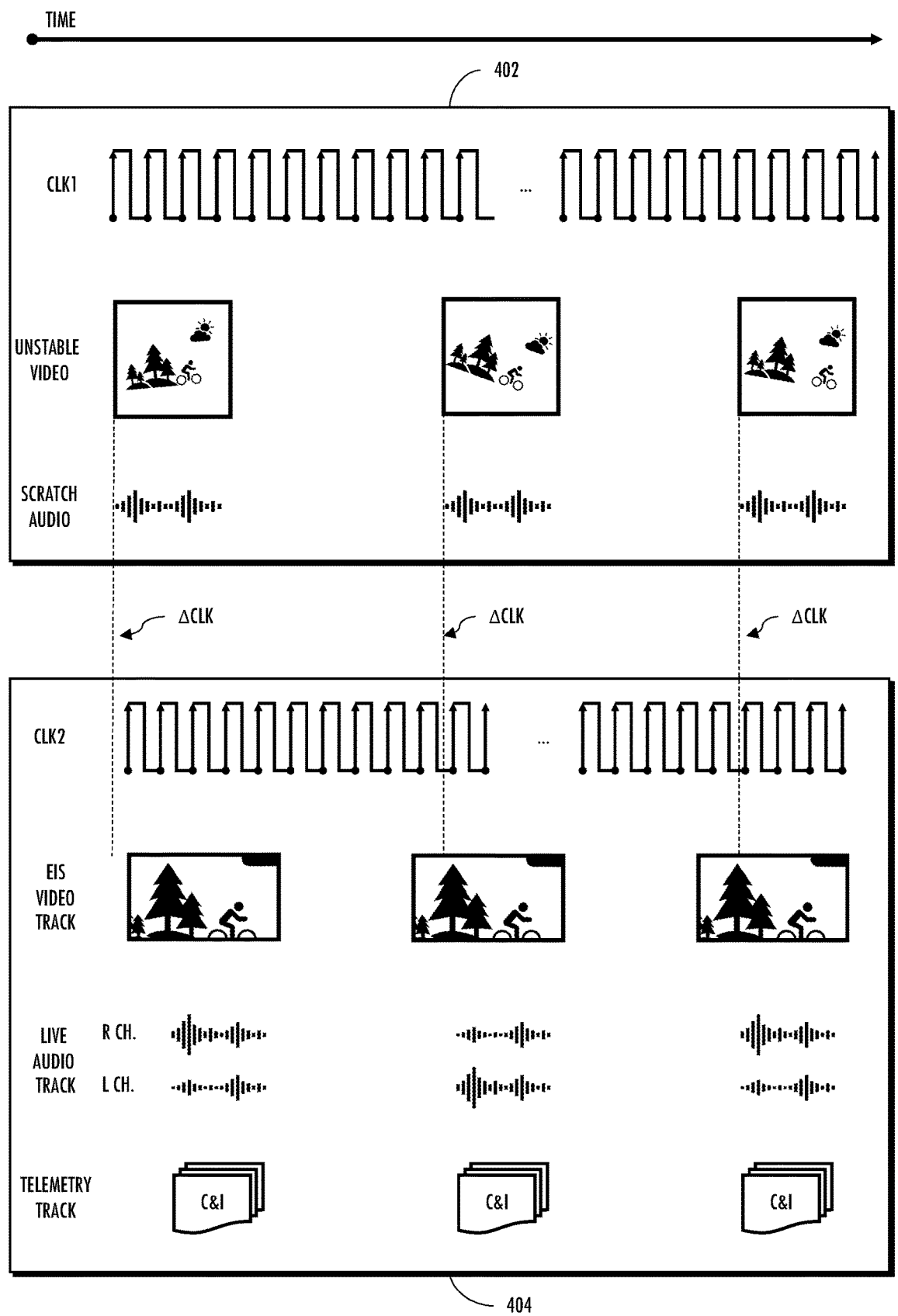
FIG. 4 is a graphical representation of clock drift, useful in explaining various aspects of the present disclosure.

As a practical matter, synchronizing clock speeds between different devices is difficult. Each device independently manages its own clock rate; due to manufacturing tolerances in clock circuitry and differences in environmental noise (e.g., temperature, voltage, etc.), even clocks that have the same nominal clock rate will drift relative to one another. FIG. 4 provides a graphical representation of clock drift, useful in explaining various aspects of the present disclosure. As shown, the cinematic video camera 402 captures unstable video and scratch audio according to a first clock (CLK1). Concurrently, the action camera 404 captures an EIS video track, records live audio, and corresponding telemetry data according to its own clock (CLK2). Slight differences in CLK1 and CLK2 result in a relative clock drift over time ($\Delta$CLK). If unchecked, the clock drift will accumulate until the two media streams are perceptibly out-of-sync; this is undesirable.

Historically, differences in synchronization could be manually fixed in post-processing, e.g., media could be cut and spliced to keep audio and visual media in sync. Other approaches have included so-called "Linear Time Code" (LTC) which encodes a time code into an audio signal. LTC implementations use up to 80 bits per frame of video (i.e., 1920 bits/sec at 24 fps) to periodically transmit a binary coded decimal value that includes hour, minute, second, and frame identification. Periodically re-synchronizing devices to a common LTC minimizes (but does not remove) clock drift to frame-level granularity. The LTC is promulgated by the Society of Motion Picture and Television Engineers (SMPTE) under the standards entitled "Television-Time and Control Code" (Revision of SMPTE 12M-1999, RP 159-1995 and RP 164-1996) and "Television — Transmission of Time Code in the Ancillary Data Space" (Revision of RP 188-1999) published Feb. 7, 2008, incorporated herein by reference in its entirety.

Existing solutions were developed and used by industry professionals for synchronizing audio and video tracks. These techniques are too labor intensive and/or inconvenient for general consumer use. Nonetheless, modern consumers increasingly demand access to more advanced tools for content generation.

Encoding Telemetry Data within Audio Waveforms

Figure 5:
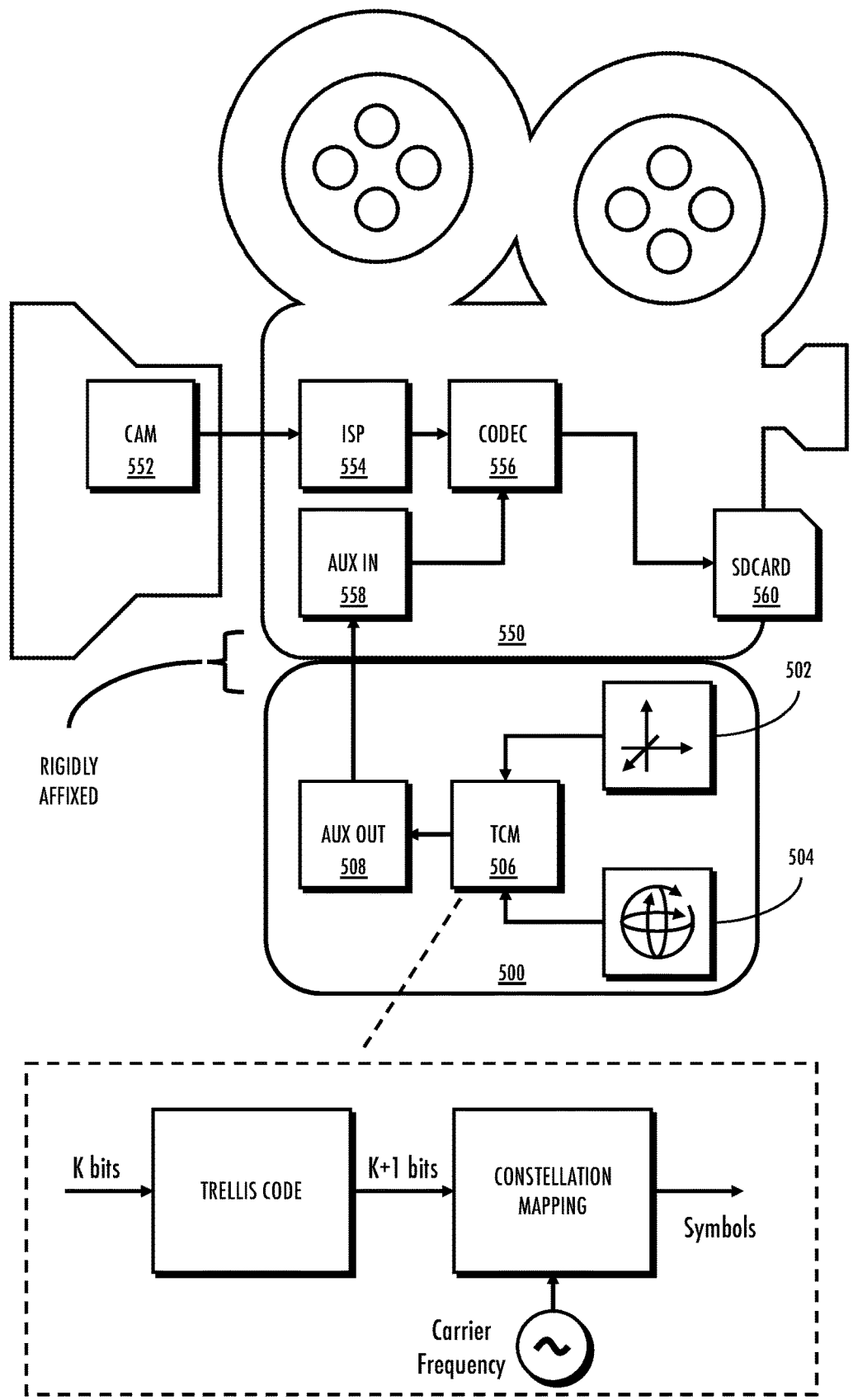
FIG. 5 is a logical block diagram of an action camera that is rigidly affixed to a second camera, in accordance with the various principles described herein.

FIG. 5 is a logical block diagram of an action camera 500 that is rigidly affixed to a second camera 550, in accordance with various aspects of the present disclosure. As used herein, the terms "rigid", "rigidly affixed", and their derivatives, refer to a physical arrangement of components that does not deform during mechanical stresses (e.g., rotation, translation, etc.) for their intended operation. In other words, the action camera 500 and the second camera 550 are physically coupled such that the rotations, translations, and/or other mechanical perturbations experienced by the action camera 500 are mechanically transferred to the second camera 550 and vice versa.

In the illustrated embodiment, the action camera 500 includes: accelerometer (ACCL 502), a gyroscope (GYRO 504), a trellis coded modulator (TCM 506), and an analog audio output (AUX OUT 508). The second camera 550 includes: a camera sensor 552, an image signal processor (ISP 554), a codec (556), an analog audio input (AUX IN 558), and removable media 560. While the illustrated example is presented in the context of a cinema-style video camera and an action camera, it is appreciated that the techniques described herein may be practiced by a variety of other apparatus. For example, other implementations may attach an action camera to a video drone, a camera dolly or other camera rig, a smart vehicle, etc. Similarly, while the following discussion is presented in the context of an action camera, it is appreciated that the video and/or audio stream may not be used; in other words, a telemetry-only device could be substituted with equal success.

As a brief aside, a trellis coded modulator (TCM 506) combines two separate functions: a convolutional encoder ("trellis code") and a constellation mapper. In the illustrated embodiment, the trellis code operates at k/k+1 rate; i.e., for every k input bits, k+1 output bits are generated. The output bits are then mapped to symbols for transmission at a carrier frequency. In one exemplary embodiment, the TCM 506 obtains a bit stream of telemetry data and encodes each bit into a 4-ary bit sequence that is mapped to amplitude frequency shift keying (AFSK) symbols for transmission over the AUX OUT 508.

Figure 6:
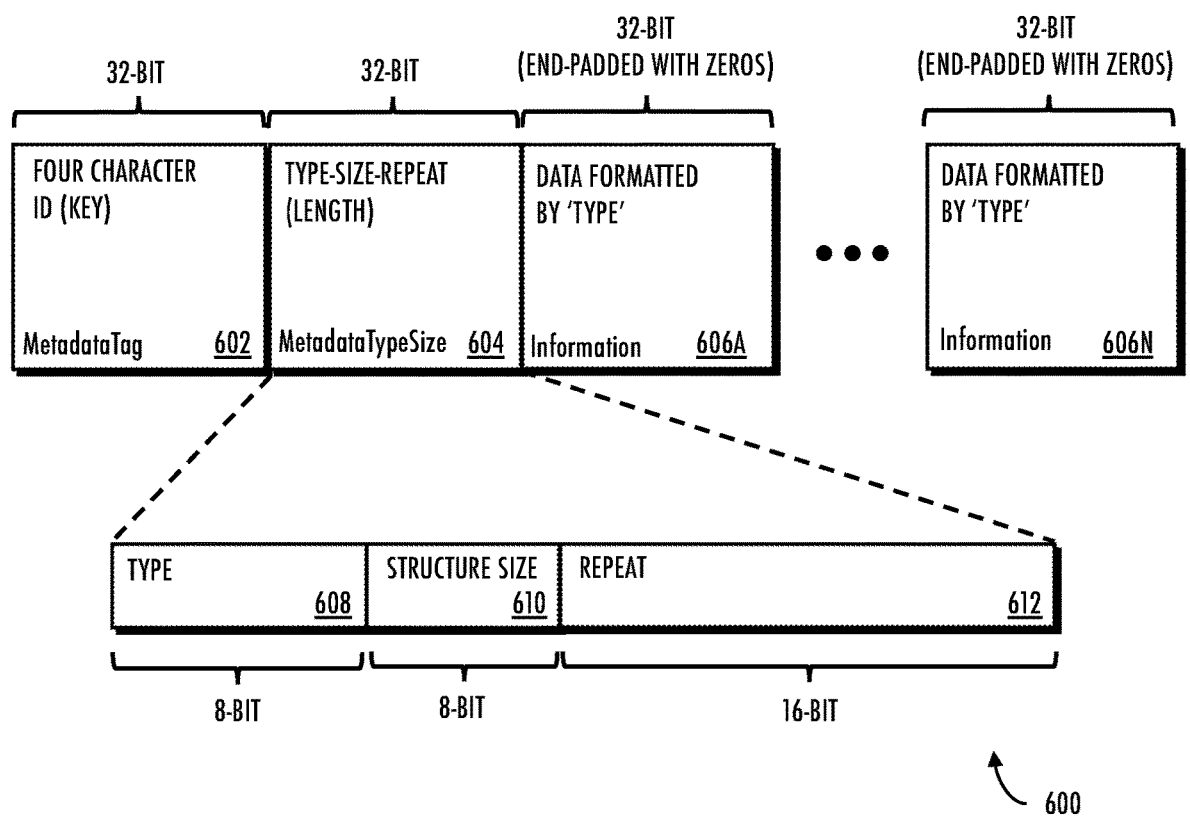
FIG. 6 is a graphical representation of one exemplary format for representing telemetry data as a metadata track, in accordance with the various principles described herein.

During operation, the action camera 500 collects telemetry data from the accelerometer (ACCL 502) and the gyroscope (GYRO 504). FIG. 6 illustrates one exemplary format for representing telemetry data as a metadata track. In one exemplary embodiment, the metadata track may be structured using a key, length, value (KLV) data format based on SMPTE 336M, Revision 07M, 2007 and entitled "DATA ENCODING PROTOCOL USING KEY-LENGTH-VALUE" incorporated herein by reference in its entirety. Various other data formats (e.g., JSON or XML data) may be substituted with equal success, given the contents of the present disclosure.

In one specific implementation, the metadata track 600 may include a MetadataTag field 602 (or "key"), a MetadataTypeSize field 604 (or "length") and one or more information blocks 606A-606N (or "values"). In some implementations, the information blocks 606A-606N may be configured as 32-bit aligned values.

The MetadataTag field 602 may include a 32-bit four-character code (fourCC) configured to identify a metadata sensor, and/or type of metadata sensor (e.g., "ACCL", "GYRO", "GRAV"). The use of fourCC tag configuration provides for readability of the file by a human as character codes may be easily discerned when, e.g., viewing the multimedia stream using a hex editor tool.

In some embodiments, the field may also include a 7-bit ASCII key to identify the type of metadata contained in the track. Certain 7-bit ASCII keys may be reserved for particular types of data; examples may include e.g., device names, device identifiers, flags for indicating nested data, scaling factors (to scale sensor data for presentation with specific units), standardized units (e.g., $m/s^2$ for acceleration), display units (e.g., a conversion from rad/s to the more common RPM for engine speed), and/or offset information (e.g., time delay, shift, etc.)

The MetadataTypeSize field 604 may include a 32-bit field for the following components: MetadataItemType field 608 (8-bit); MetadataItemSize field 610 (8-bit), and MetadataItemRepeat field 612 (16-bit). The MetadataItemType field 608 may include a single character field that may be used to characterize a format of the information item the within payload (e.g., the smallest unit of the payload). By way of an illustration, a 32-bit floating value may correspond to type "f", an 8-bit character string may be characterized by type "c" (where a single character is the smallest unit). Similarly, a three component 16-bit accelerometer payload may be characterized by type "s" (where a single acceleration value is a short integer of 2 bytes), and all three components of acceleration (e.g., x, y, and z values) may use the same MetadataItemType in the metadata record.

The MetadataItemSize field 610 may include a binary 8-bit integer indicating a number of bytes per metadata item. By way of an illustration, an 8-bit character string of type "c", may correspond to the MetadataItemSize size of 1. Three 16-bit accelerometer values of type "s" may correspond to the MetadataItemSize of 6 bytes.

The MetadataItemRepeat field 612 may include a 2-byte (16 bit) big-endian binary code integer value containing information related to number of items in the payload record (information blocks 606A-606N). The number of items in the payload may correspond to e.g., a number of samples (e.g., gravity vector where individual samples may include a single value), and/or number of samples where a given sample may include multiple values (e.g., 3-components of acceleration may correspond to 3×16-bit values forming one payload item).

Table 1 provides an illustrative set of metadata, useful in conjunction with the various embodiments described herein:

TABLE 1

| FourCC | Property | Approximate Frequency | Units | Comment |
|---|---|---|---|---|
| ACCL | 3-axis accelerometer | 200 | $m/s^2$ | Data order (by axis) Z, X, Y |

TABLE 1-continued

| FourCC | Property | Approximate Frequency | Units | Comment |
|---|---|---|---|---|
| GYRO | 3-axis gyroscope | 400 | rad/s | Data order (by axis) Z, X, Y |
| MAGN | magnetometer | 24 | µT | Camera pointing direction |
| CORI | Camera ORIentation | frame rate | n/a | Quaternions for the camera orientation since capture start |
| IORI | Image ORIentation | frame rate | n/a | Quaternions for the image orientation relative to the camera body |
| GRAY | GRAvity Vector | frame rate | n/a | Vector for the direction for gravity |

Additional techniques for structured metadata representation may be used consistent with the present disclosure, the foregoing being purely illustrative. For example, other techniques are described in U.S. Pat. No. 10,431,258 entitled "APPARATUS AND METHODS FOR EMBEDDING METADATA INTO VIDEO STREAM" issued Oct. 1, 2019, and Newman, D., "GPMF Introduction" for the GPMF Parser, retrieved Jul. 7, 2021 from https://github.com/gopro/gpmf-parser/blob/master/docs/README.md, each of which is incorporated herein by reference in its entirety. As described therein, additional sensor types and a hierarchical metadata storage approach may be used and/or extended consistent with the principles described herein.

Referring back to FIG. 5, the telemetry data may be pre-processed into quaternions that describe device motion. As a brief aside, quaternions are four-dimensional vectors generally represented in the form a+bi+cj+dk where: a, b, c, d are real numbers; and i, j, k are the basic quaternions that satisfy $i^2=j^2=k^2=ijk=-1$. Points on the unit quaternion can represent (or "map") all orientations or rotations in three-dimensional space. Quaternion calculations can be efficiently implemented in software to perform rotation and translation operations on image data, also the additional dimensionality of quaternions can prevent/correct certain types of errors/degenerate rotations (e.g., gimble lock); quaternions are often used to perform EIS manipulations (e.g., pan and tilt using matrix operations). As but one such example, an image orientation (IORI) quaternion may provide a counter-rotation/translation to a camera orientation (CORI) quaternion—in other words, the IORI represents an image orientation as a vector relative to the camera's orientation. While discussed with reference to quaternions, artisans of ordinary skill in the related art will readily appreciate that the orientation may be expressed in a variety of systems.

In one exemplary embodiment, the telemetry data is modulated into an analog audio waveform via the modulator (TCM 506). Pre-processed telemetry data has an approximate rate of ~10,000 bits/second (10 Kbps). Most audio codecs provide ~40 Khz of bandwidth; for example, AAC provides 48 KHz of audio once every 24 frames, or about 2000 Hz of bandwidth every frame. As a practical matter, an 8-ary TCM codec can provide approximately 16 Kbps (e.g., $$2000 \frac{\text{symbols}}{\text{second}} \times 8 \frac{\text{bits}}{\text{symbol}} = 16{,}000 \frac{\text{bits}}{\text{second}})$$

which is more than sufficient bandwidth to provide 16-bit 3-axis updates at 200 Hz for GYRO (e.g., $$200 \frac{GYRO \text{ readings}}{\text{second}} \times \left(16 \frac{Z \text{ bits}}{\text{reading}} + 16 \frac{Z \text{ bits}}{\text{reading}} + 16 \frac{Y \text{ bits}}{\text{reading}}\right) =$$
$$9600 \frac{GYRO \text{ bits}}{\text{second}})$$

or in-camera CORI data. Even higher data rates may be possible using higher order TCM coding; for example, a 16-ary TCM codec can provide 32 Kbps. Notably, the most common AAC encodings provide sufficient bandwidth for bit rates of 128 Kbps, 192 Kbps, and 256 Kbps; thus, TCM telemetry data easily falls within the codec capabilities.

Figure 7:
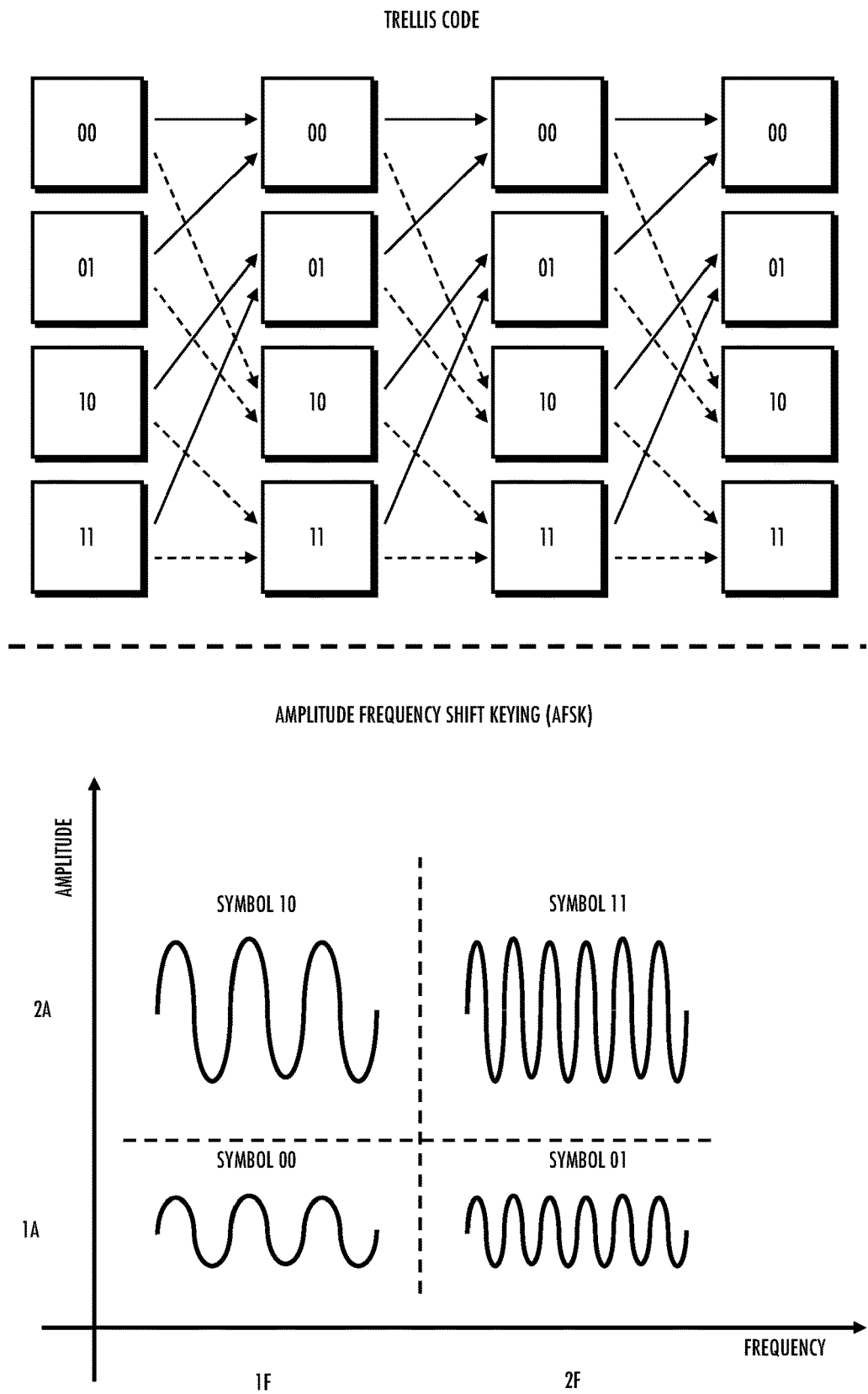
FIG. 7 is a graphical representation of one illustrative M-ary scheme for trellis coded modulation (TCM), in accordance with the various principles described herein.

One illustrative 4-ary scheme for TCM modulation is presented in FIG. 7. The depicted scheme reduces symbol count for ease of explanation. First, the telemetry track may be converted to a bitstream; each bit of the bitstream is convolutionally encoded into a 4-ary symbol. Each new bit triggers a state transition within the trellis. Notably, not all state transitions are available; for example, symbol "01" may only transition to either "00" or "10". Conceptually, the encoded sequence can be represented as a path traversing the graph. Invalid transitions represent errors; thus, the received sequence of symbols can be decoded by identifying the valid path with the smallest error magnitude (also referred to as "maximum-likelihood soft-decision decoding").

Once the bitstream is trellis coded into symbols, each of the symbols is mapped to a constellation. As one illustrative example, the symbols are modulated using a combination of amplitude shift keying and frequency shift keying (AFSK). Specifically, each set of 4-ary symbols are transmitted as combinations of amplitude (volume) and frequency (tone) symbols. More generally, the techniques described herein may be broadly extended to any "arity" of constellation (i.e., "arity" and "-ary" refers to the number of symbols in the constellation), e.g., an 8-ary constellation may use 2 amplitudes and 4 frequencies to convey 8 different bits within the same symbol duration, a 16-ary constellation may use 4 amplitudes and 4 frequencies to convey 16 different bits, etc. In other words, any M-ary shift keying scheme may be substituted with equal success.

As a brief aside, the Advanced Audio Coding (AAC) standard for lossy digital audio compression that is promulgated within the MPEG-4 specification does not preserve phase information during compression/decompression of a single (mono) audio track; in the foregoing discussion AFSK is used since, phase shift keying (PSK) techniques cannot be used without phase information. Nonetheless, other device ecosystems that preserve phase information may use PSK variants without limitation. Even though humans cannot directly perceive phase; phase differences can result in constructive/destructive interference. Phase-based interference from different speaker sources is typically used to create e.g. stereo audio effects. Thus, codecs that support stereo audio tracks may be able to preserve PSK signaling (or its derivatives). While the foregoing discussion is presented in the context of an AFSK scheme, any hybrid phase shift keying technique may be substituted with equal success. Examples of hybrid phase shift keying systems include without limitation: QPSK, 16 QAM, 64 QAM, etc.

Referring back to FIG. 5, the AFSK symbols are transmitted from the action camera 500 to the second camera 550 via the AUX OUT 508 and AUX IN 558 interfaces. The second camera 550 can operate normally without modification—e.g., telemetry-over-audio can be handled by a wide variety of legacy cameras. In one specific implementation, an audio waveform of varying volumes (amplitude) and tones (frequency) is transmitted via audio cabling (e.g., via a 3.5 mm AUX IN/OUT). Concurrently, the second camera 550 captures raw image data via the camera sensor 552 which are demosaiced and color corrected via the image signal processor (ISP 554). The images are then encoded into video with the audio waveform (i.e., the telemetry-over-audio) by the codec 556. It should be noted that the audio waveform is sampled according to the second camera's clock domain; in other words, the audio waveform representing the telemetry track is time-aligned to the captured video (i.e., a common reference clock).

During second camera 550 operation, the codec 556 encodes the video as an audio/visual (A/V) data structure. The A/V data structure may be stored (written) to removable media 560 or transferred off-device via a data/network interface (e.g., Wi-Fi, Ethernet, cellular connectivity, etc.) to a subsequent post-processing apparatus.

Figure 8:
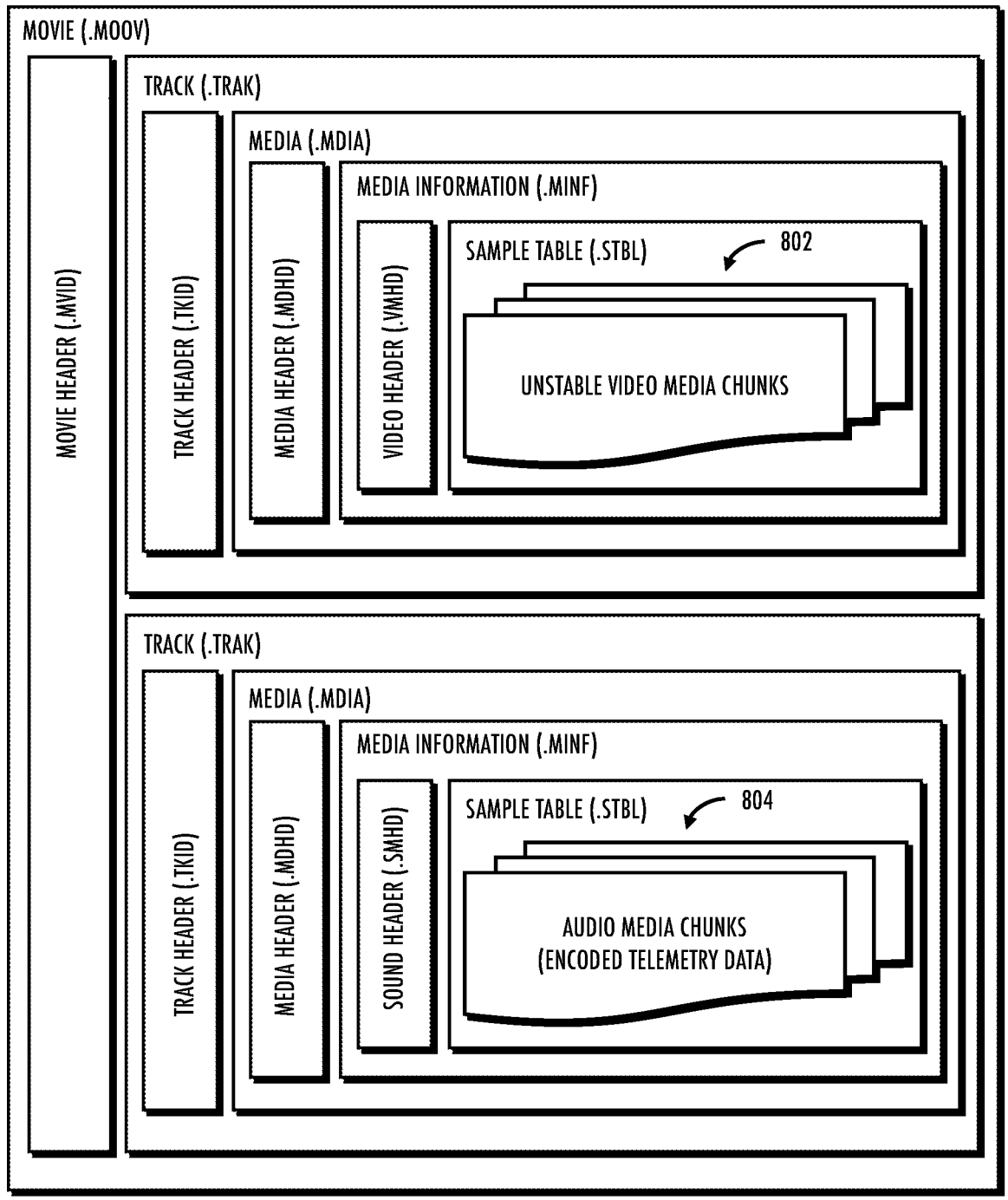
FIG. 8 is a graphical representation of one exemplary MPEG-4 file format that may be useful for codec-based transfer, in accordance with the various principles described herein.

FIG. 8 depicts one exemplary MPEG-4 file format that may be useful for codec-based transfer. As shown, the unstable video media chunks 802 and the audio media chunks 804 (which represent encoded telemetry data) that were captured from the second camera 550 are stored (written) in separate tracks of the MPEG-4 data structure. In other embodiments, the codec 556 may encode the tracks as separate tracks and/or data structures—separate data structures are often more convenient to index and/or parse in special purpose applications. In still other embodiments, the codec 556 may comprise a separate video and audio codec; for example, a hardware codec may only handle video—audio tracks may be encoded in a virtualized software codec. Dual encoder implementations are commonly used where the audio can be highly compressed (e.g., teleconferencing type devices may use vocoders that are optimized for human voices, rather than a true audio codec which can capture the full audible spectrum); more generally however, any combination of codecs and/or file data structures may be substituted with equal success.

While the foregoing images depict a two-track data structure, artisans of ordinary skill in the related arts given the contents of the present disclosure will readily appreciate that other configurations may be substituted with equal success. For example, an action camera 500 and second camera 550 that have a stereo AUX IN/OUT connection may transfer telemetry data in one channel (e.g., the right channel) and scratch audio in the other channel (e.g., the left channel). Scratch audio may be useful to capture and synchronize off-screen audio effects generated by the captured environment. In some cases, the scratch audio may be a mono track of audio, rather than a true directional channel. Still other implementations may use other formats besides MPEG-4. Examples of such formats include, without limitation, MPEG-2, High Efficiency Video Coding (HEVC), Theora, RealVideo RV40, VP9, and AOMedia Video 1 (AV1), etc. Additionally, other video container formats may be used as well including 3GPP, 3GPP2, Advanced Systems Format (ASF), Audio Video Interleave (AVI), DivX Media Format (DMF), MPEG-4, MPEG Transport Stream (MTS), material exchange format (MXF), Ogg, RealMedia Variable Bitrate (RMVB), Video Object (VOB), WebM, etc.

In one embodiment, a post-processing apparatus can obtain the audio/visual (A/V) data structure and extract the encoded audio waveform. The encoded audio waveform is decoded to telemetry data. In one exemplary embodiment, the post-processing apparatus extracts the unstable video media chunks 802 and the audio media chunks 804 (containing the encoded telemetry data) from an MPEG-4 container. The unstable video media chunks 802 can be decoded "as-is". The audio media chunks 804 are decoded to an analog waveform comprising the AFSK modulated telemetry data. The combination of volume (amplitude) and tones (frequency) are decoded in two steps: envelope detection and variable frequency mixing (frequency detection). For example, in the illustrative scheme of FIG. 7, envelope detection determines the magnitude of each AFSK symbol relative to a threshold. Symbols above the threshold may correspond to a "1" in the $1^{st}$ bit of the 4-ary symbol, symbols below the first threshold correspond to a "0" in the $1^{st}$ bit, etc. Similarly, frequency detection can be performed with variable frequency mixing; i.e., non-matching frequency components sum to zero when mixed, only the matching frequencies mix to a non-zero result. Transmissions at a first frequency correspond to a "0" in the $2^{nd}$ bit of the 4-ary symbol, transmissions at a second frequency correspond to a "1" in the $2^{nd}$ bit.

After constellation de-mapping, the TCM symbols are trellis decoded using a corresponding convolutional decoder. The resulting telemetry data can be stored (written) into a telemetry data track that is time-aligned with the unstable video track. Then, the post-processing apparatus may use the telemetry data to enable metadata-based cinematography, production effects, shot selection, and/or other content augmentation techniques such as are described in U.S. patent application Ser. No. 16/934,628 entitled "METHODS AND APPARATUS FOR METADATA-BASED PROCESSING OF MEDIA CONTENT" filed Jul. 21, 2020, previously incorporated herein by reference in its entirety.

Exemplary Methods and Apparatus

Figure 9:
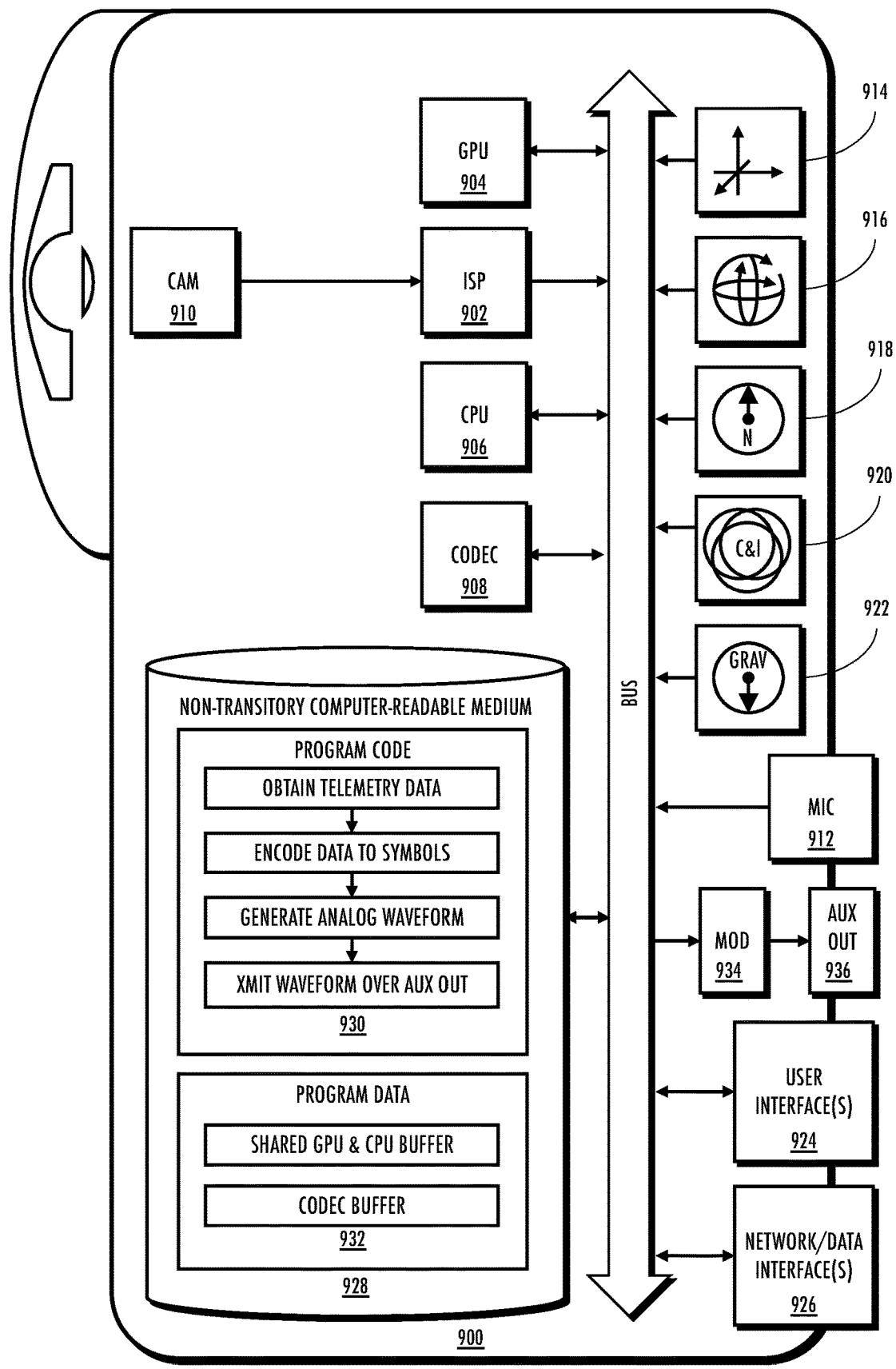
FIG. 9 is a logical block diagram of a source device, useful in conjunction with various aspects of the present disclosure.

FIG. 9 is a logical block diagram of a source device 900, useful in conjunction with various aspects of the present disclosure. The source device 900 includes a processor subsystem, a memory subsystem, a sensor subsystem, a user interface subsystem, a network/data interface subsystem, and a bus to connect them. During operation, telemetry or other data is obtained via the sensor subsystem, the data is encoded to symbols, an analog waveform is generated based on the symbols, and the analog waveform is transmitted over an auxiliary output. In one exemplary embodiment, the source device 900 may be an action camera that captures audio and/or video footage. In fact, the techniques described herein may be further pared-down to a light-weight assembly (e.g., sensors, processors, modulator, and data interface) that can be rigidly affixed to another camera (piggybacked). Still other embodiments of source devices may include without limitation: a smart phone, a tablet, a laptop, an aerial drone, security cameras, self-driving cars, smart appliances and/or industrial automation, and/or any other source of data.

In one embodiment, the processor subsystem may read instructions from the memory subsystem and execute them within one or more processors. The illustrated processor subsystem includes: an image signal processor (ISP 902), a graphics processing unit (GPU 904), a central processing unit (CPU 906), and a hardware codec 908. In one specific implementation, the ISP 902 maps captured camera sensor data to a linear color space. ISP operations may include without limitation: demosaicing, color correction, white balance, and/or autoexposure. In one specific implementation, the GPU 904 performs in-device modifications to image data; GPU tasks may be parallelized and/or constrained by real-time budgets. GPU operations may include, without limitation: lens corrections (stitching, warping, stretching), image corrections (shading, blending), noise reduction (filtering, etc.) In one specific implementation, the CPU 906 controls device operation and/or performs tasks of arbitrary complexity/best-effort. CPU operations may include, without limitation: operating system (OS) functionality (power management, UX), memory management, etc. In one specific implementation, the hardware codec 908 converts image data to an encoded data for transfer and/or converts encoded data to image data for playback. Other processor subsystem implementations may multiply, combine, further subdivide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the sensor subsystem may sense the physical environment and capture and/or record the sensed data. In some embodiments, the sensor data may be further stored (written) as a function of capture time (so-called "tracks"). Tracks may be synchronous (aligned) or asynchronous (non-aligned) to one another. The illustrated sensor subsystem includes: a camera sensor 910, a microphone 912, and an inertial measurement unit configured to detect and characterize device motion (e.g., an accelerometer (ACCL 914), a gyroscope (GYRO 916), a magnetometer (MAGN 918)). In the illustrated implementation, combinations of the sensed data can be used to derive translational and/or rotational movements; such derived data may include: camera orientation and/or image orientation quaternions (CORI/IORI 920) as well as gravity vectors (GRAV 922).

In one specific implementation, the camera sensor 910 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YCrCb, etc.) for each pixel of an image.

In one specific implementation, the microphone 912 senses acoustic vibrations and converts the vibrations to an electrical signal (via a transducer, condenser, etc.) The electrical signal may be further transformed to frequency domain information. In one specific implementation, the gyroscope (GYRO 916) measures rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 920). In one specific implementation, the magnetometer (MAGN 918) may provide a magnetic north vector (which may be used to "north lock" video and/or augment location services such as GPS), similarly the accelerometer (ACCL 914) may also be used to calculate a gravity vector (GRAV 922). Furthermore, while the foregoing discussion is presented in the context of CORI calculations based on gyroscope (GYRO 916), other implementations may incorporate data from the accelerometer (ACCL 914). For example, accelerometer data may be used with image information to estimate camera translations using image analysis. Other sensor subsystem implementations may multiply, combine, further subdivide, augment, and/or subsume the foregoing functionalities within these or other processing elements. For example, two or more cameras may be used to capture panoramic (e.g., wide or 360°) or stereoscopic content. Similarly, two or more microphones may be used to record stereo sound.

In one embodiment, the user interface subsystem may be used to present media to, and/or receive input from, a human user. In some embodiments, media may include audible, visual, and/or haptic content. Examples include images, QR codes (or similar computer-readable images), videos, sounds, and/or vibration. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen). In one exemplary embodiment, the user interface subsystem 924 may include an assortment of a touchscreen, physical buttons, and a microphone.

In one embodiment, the network/data interface subsystem may be used to receive data from, and/or transmit data to, other devices. In some embodiments, data may be received/transmitted as transitory signals (e.g., electrical signaling over a transmission medium.) In other embodiments, data maybe received/transmitted as non-transitory symbols (e.g., bits read from non-transitory computer-readable mediums.) The network/data interface subsystem may include: wired interfaces, wireless interfaces, and/or removable memory media. In one exemplary embodiment, the network/data interface subsystem 926 may include network interfaces including, but not limited to: Wi-Fi, Bluetooth, Global Positioning System (GPS), USB, and/or Ethernet network interfaces. Additionally, the network/data interface subsystem 926 may include removable media interfaces such as: SD cards (and their derivatives) and/or any other optical/electrical/magnetic media (e.g., MMC cards, CDs, DVDs, tape, etc.)

In one embodiment, the network/data interface subsystem may include a modulator 934 and an analog output 936. In one exemplary embodiment, the modulator 934 is a trellis coded modulator (TCM) and the analog output is an audio output channel (AUX OUT). During "data-over-audio" operation, the TCM modulator encodes data as symbols; the symbols are then transmitted as analog electrical signals corresponding to an audio signal via the AUX OUT. Any device with an audio input channel (AUX IN) may receive and record the analog electrical signals as audio input (e.g., acoustic vibrations that are represented as an electrical signal). In one such implementation, the audio input is not explicitly clocked by the source device and may be asynchronously sampled according to the recipient device's clock (e.g., for recording as an audio media track). While the foregoing discussions have been presented in the context of an asynchronous data transfer using amplitude and frequency shift keying (AFSK), other implementations may use other modulation schemes and/or clocking schemes.

Referring back to FIG. 9, the memory subsystem may be used to store (write) data locally at the source device 900. In one exemplary embodiment, data may be stored as non-transitory symbols (e.g., bits read from non-transitory computer-readable mediums.) In one specific implementation, the memory subsystem 928 is physically realized as one or more physical memory chips (e.g., NAND/NOR flash) that are logically separated into memory data structures. The memory subsystem may be bifurcated into program code 930 and/or program data 932. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In one embodiment, the program code includes non-transitory instructions that when executed by the processor subsystem cause the processor subsystem to perform tasks which may include: calculations, and/or actuation of the sensor subsystem, user interface subsystem, and/or network/data interface subsystem. In some embodiments, the program code may be statically stored within the source device 900 as firmware. In other embodiments, the program code may be dynamically stored (and changeable) via software updates. In some such variants, software may be subsequently updated by external parties and/or the user, based on various access permissions and procedures.

In one embodiment, the tasks are configured to obtain telemetry data from the sensor subsystem. The exemplary embodiments described above are presented in the context of an action camera that captures telemetry data while piggybacked to another camera, however the techniques described herein may be broadly generalized to a variety of other applications and/or implementations with equal success.

In one embodiment, the telemetry data describes the movement of a camera device, and by extension, any rigidly affixed device that has substantially similar movement (after accounting for physical offsets in translation and rotation). In one implementation, gyroscope data are sensed and used to derive quaternions that describe a camera's motion (e.g., camera orientation (CORI)). In other embodiments, the telemetry data may describe the movement and/or relative positioning of the camera to its video feed (after in-camera stabilization); in some such cases, the relative positioning may be provided as an image orientation (IORI). Notably, the relative difference between the IORI and CORI compensate (counteract) for camera motion; in other words, the telemetry data may be used to infer the in-camera stabilization. In some cases, in-camera stabilization may be used by a post-processor without correction (e.g., to reduce post-processing); in other cases, in-camera stabilization may be used to improve post-processing results. Still other variants may include orientation data for other objects; for example, in some implementations, an orientation of a subject of interest (SORI) may be tracked relative to the camera's motion. As but one such example, facial recognition software may be used to frame a designated view according to a moving face. In some variants, sensors may be attached to the subject (rather than the camera) to provide more accurate data.

While the foregoing discussion has been presented in the context of sensor-based telemetry data, other schemes for obtaining telemetry data may be substituted with equal success. In some embodiments, device movement may be determined from external reference positioning; examples of such techniques may include triangulation (e.g., GPS, GLONASS, etc.), sounding/ranging (sonar, lidar, etc.), image analysis, explicit location data (e.g., provided from another device), and/or any other such technique. More generally, any scheme for receiving, retrieving, generating, or otherwise obtaining telemetry data for one or more devices may be substituted with equal success.

Furthermore, while the illustrative example is presented in the context of telemetry data and video capture, a multipurpose camera mode select maybe substituted with equal success. For example, in some cases, the camera may have a "telemetry-only" mode that only captures telemetry data and outputs the encoded data as audio. Other implementations may allow for switching between telemetry-only, telemetry with full capture, and capture-only mode (without telemetry data). In some such variants, the telemetry device may be further controlled by the sink device to e.g., start/stop recording, take readings at a particular rate (e.g., based on the camera frame rate), etc.

Additionally, the foregoing discussion is presented in the context of videos for consumer electronics, however the techniques may have broad applicability to other applications as well, including for example, machine vision applications. Machine vision often has different considerations than human applications. For instance, self-driving cars may use telemetry data to capture the car's velocity, acceleration, and/or other orientation information. Notably, the car's actual orientation is often much more important than the engine (RPM) and/or steering (dangerous situations often involve skidding, hydroplaning, etc. where the car has lost some or all traction). Similarly, surveillance, industrial, and/or medical imagery may use cameras that are inserted into another object (e.g., endoscopes, etc.) and/or independently move relative to a target of interest. In such applications, audio may be of lesser (or no) importance. Providing telemetry data as data-over-audio allows commodity, rather than special-purpose, components to be used to reduce cost.

As used herein, the term "telemetry data" refers to data that is collected in-situ during media capture. The foregoing discussion has described telemetry data, however any immersive metadata may be substituted with equal success. Immersive metadata is more broadly described within U.S. patent application Ser. No. 16/934,628 entitled "METHODS AND APPARATUS FOR METADATA-BASED PROCESSING OF MEDIA CONTENT" filed Jul. 21, 2020, previously incorporated herein by reference in its entirety. As used herein, the term "immersive" refers to media that includes multiple sensory modalities from a common temporal or spatial coordinate (e.g., point-of-view and/or time-of-view). Immersive media plunges the viewer back into the lived-in experience by exciting multiple senses or modalities of expression, as if the viewer were re-living the experience. As but one such variant, a car may have a tachometer that produces instantaneous metadata in the form of revolutions per minute (RPM) data-over-audio. RPM data may be used in subsequent post-processing visualizations to e.g., add motion blur/redline tinting. Similarly, a user may have a heart rate monitor that produces instantaneous metadata in the form of beats per minute (BPM) data-over-audio. BPM data may be used in subsequent post-processing visualizations to e.g., provide lived-in heartbeat audio, etc.

In one embodiment, the tasks are configured to encode the data to symbols by the processing subsystem. As used herein, a "symbol" refers to a discrete mapping of data to another useful representation. For example, digital data may be modulated to symbols that are suitable for transmission via a transmission line. Specifically, the symbols may enable robust propagation through a transmission line that introduces noise and/or other distortions. As described elsewhere, the original digital data may later be reconstructed based on the received symbols using symbol detection techniques.

As used herein, the terms "modulate", "modulation", and their linguistic derivatives refer to schemes that modify physical characteristics of a wave function (frequency, amplitude, phase, etc.) into symbols that are suitable for transmission over a transmission line. Notably, modulation may be performed at a carrier wave frequency or at baseband (e.g., without a carrier frequency). Baseband modulation is sufficient for data-over-audio transmission; carrier wave-based variants may be useful for transmission over e.g., radio waves and/or other band-limited media. In some cases, additional layers of data validation, parity, forward error correction, and/or other coding techniques may be used in conjunction with the modulation scheme to improve the signal quality relative to noise/distortion.

A "transmission line" refers to any transmission media with logical or physical properties that constrain signal propagation. For example, a physical wire may attenuate the amplitude and/or frequency characteristics of an electrical signal. Similarly, air, water, or other acoustic media may attenuate the amplitude and/or frequency characteristics of an acoustic signal.

In one embodiment, the tasks are configured to generate an analog waveform based on the symbols. As but one such example, an analog sinusoidal waveform may be generated using an oscillator, amplifier, attenuator, and associated control circuitry. The oscillator is typically a crystal oscillator that generates an oscillating waveform based on an applied voltage; increasing voltage may result in faster oscillations, reducing voltage may result in lower oscillations (within a range). The amplifier and/or attenuator may modify the amplitudes of frequency components of the oscillation. In some implementations, additional filtering may be used to provide other desirable signal-to-noise characteristics e.g., to fit the waveform in the perceptible audio bandwidth (20 Hz-20 KHz), to compensate for environmental effects (e.g., temperature, impedance variation), etc. The control logic may be used to adjust the corresponding amplitude, frequency and/or phase to create the desired symbols.

More generally however, any suitable analog waveform generation circuitry may be substituted with equal success. Examples of such modulators may include e.g., amplitude shift keying (ASK), frequency shift keying (FSK), phase shift keying (PSK), and any of their hybrids and derivatives. As previously alluded to, the foregoing discussions have been presented in the context of amplitude frequency shift keying (AFSK) since intermediary codecs may not preserve phase, however phase-aware systems may implement hybrid phase shift keying systems include without limitation: QPSK (quadrature phase shift keying), 16 QAM (16-quadrature amplitude modulation), 64 QAM, etc.

The schemes described herein allow a recipient device to sample the analog waveform according to the recipient's clock; this allows for asynchronous data transfer. As a brief aside, the term "synchronous" refers to systems and operations that have a common (shared) time reference. For example, a source and sink device that can transfer symbols according to a common clock are said to be "synchronous" or "synchronized." Synchronous data transfers can occur without rate matching—e.g., data output is clocked at the same rate as data input. In contrast, the term "asynchronous" refers to systems and operations that have different (independent) clock domains. Asynchronous systems may have lossy/lossless data transfers. As but one example of a "lossy" transfer, an asynchronous transfer from a source device maybe sampled according to the sink device's clock domain. Sampling may not preserve a one-to-one mapping of data between endpoints—in other words, large clock discrepancies may result in a different number of input/output symbols. Lossless examples may use e.g., handshakes and/or buffering to ensure that every data sample that was sent, will be correctly received.

In one exemplary embodiment, the analog waveform may include symbols to improve and/or compensate for asynchronous transmission. For example, a string of symbols may include preamble (before data-over-audio), midamble (within the data-over-audio), and/or postamble (after data-over-audio) which allow the recipient device to correctly align and frame the data-over-audio. In some instances, a cyclic prefix (postfix) may be used to simplify operation for data frames of repeating known length. During operation, the sampled analog waveform (including the cyclic prefix (postfix)) can be wrapped in a circular buffer; the cyclic prefix (postfix) can then be trimmed-out to remove arbitrarily shifting timing delay (only the sampled data remains).

In one embodiment, the tasks are configured to transmit the analog waveform via a network/data interface e.g., to an intermediary device. In one embodiment, the network/data interface is an audio output (AUX OUT) that can transmit an analog electrical signal. Typically, the AUX OUT is implemented with a 3.5 mm audio plug (tip-sleeve (TS), tip-ring-sleeve (TRS), or tip-ring-ring-sleeve (TRRS)), 1/4" audio plug (tip-sleeve (TS), tip-ring-sleeve (TRS)), and/or or phono connectors (RCA component/composite), etc. In other embodiments, the network/data interface may be a digital interface that fits an adaptor for generating analog electrical signals; for example, a USB interface may be coupled with an audio adaptor to generate AUX OUT signaling.

In the foregoing examples, the analog waveform is captured, sampled, and recorded by an intermediary device (e.g., another camera device) via electrical signaling (AUX IN/OUT). In other embodiments, the analog waveform may be acoustically played for other devices to record. For instance, true acoustic audio (rather than electrical waveforms) may be used where physical connectivity is not feasible. As but one such scenario, the telemetry device(s) may be remote from the video capture device. Notably, acoustic waves can be linearly superimposed; thus, recorded audio may contain multiple concurrent measurements. Acoustic transmission may impose additional signal-to-noise and/or distortion restrictions. For example, fading and/or multipath (echoes) transmission may limit the distinguishable amplitudes. In some implementations, modulation techniques may be selected to minimize such effects (e.g., frequency shift keying (FSK)) and/or subsequent signal processing may be used to discard/correct the data (forward error correction (FEC), cyclic redundancy checks (CRC), parity, etc.)

The examples described above provide telemetry data as a data-over-audio link, however other techniques for obtaining telemetry data, immersive metadata, etc. may be substituted with equal success. As but one such variant, the techniques may be broadly applied to any number of cameras and/or capture modalities. For example, telemetry data and/or immersive metadata may be recorded by multiple different devices and provided via e.g., different audio channels (e.g., left channel, right channel, front channel, etc.) Still other variants may be substituted with equal success by artisans of ordinary skill, given the contents of the present disclosure.

Figure 10:
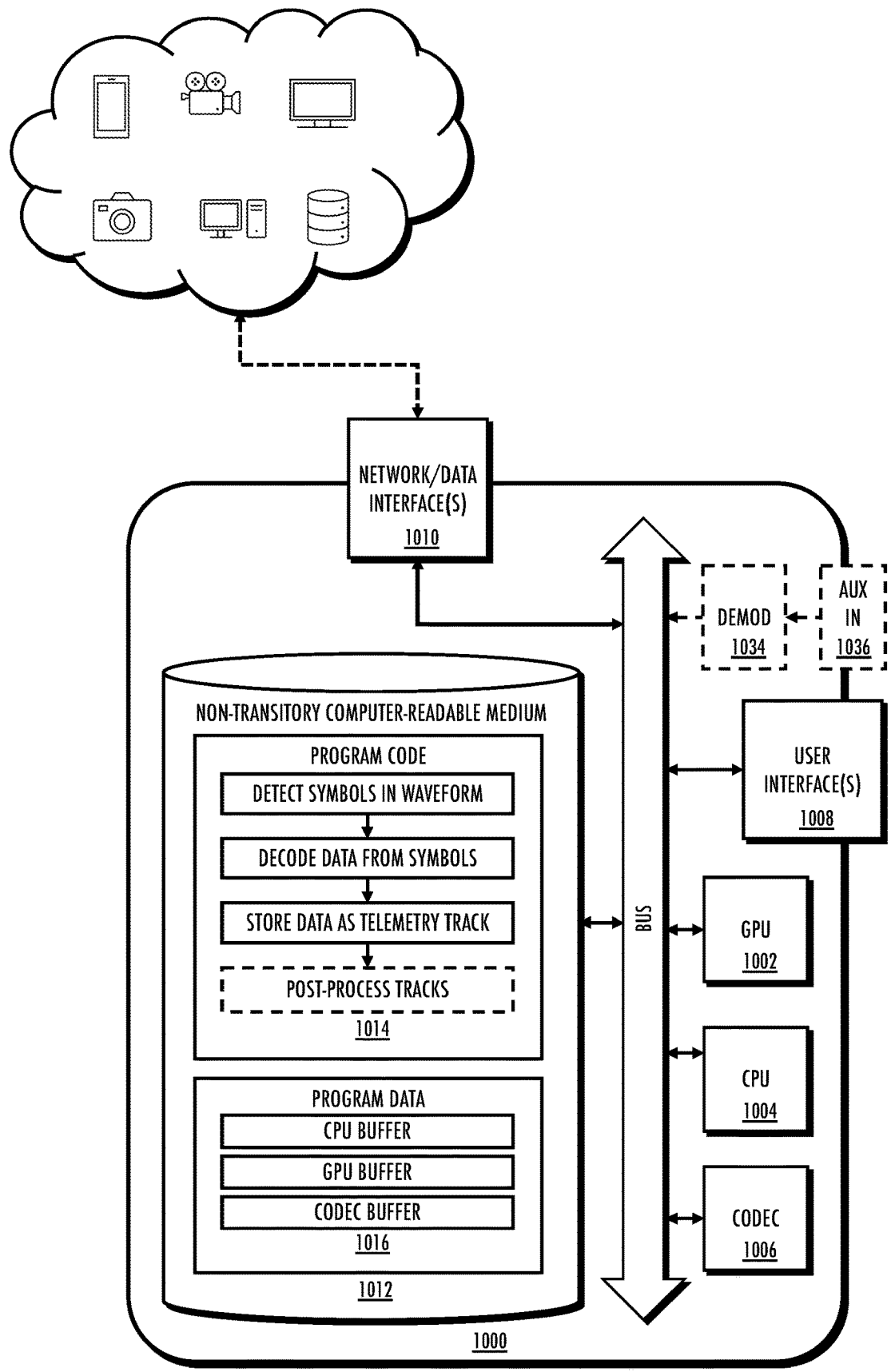
FIG. 10 is a logical block diagram of a sink device, useful in conjunction with various aspects of the present disclosure.

Referring now to FIG. 10, a logical block diagram of a sink device 1000 useful in conjunction with various aspects of the present disclosure is presented. The sink device 1000 includes a processor subsystem, a memory subsystem, a user interface subsystem, a network/data interface subsystem, and a bus to connect them. During exemplary operation, the sink device obtains an analog waveform and detects symbols in the analog waveform, decodes data from the symbols, and stores the data to a telemetry track (or other media track). In some variants, the telemetry data may additionally be used during a post-processing operation. In one exemplary embodiment, the sink device 1000 may be a smart phone that plays audio and/or video footage. Other embodiments of source devices may include without limitation: an action camera, a tablet, a laptop, a television, a workstation, and/or any other sink of data.

In one embodiment, the processor subsystem may read instructions from the memory subsystem and execute them within one or more processors. The illustrated processor subsystem includes: a graphics processing unit (GPU 1002), a central processing unit (CPU 1004), and a codec 1006. Other processor subsystem implementations may multiply, combine, further subdivide, augment, and/or subsume the foregoing functionalities within these or other processing elements. For example, multiple GPUs may be used to perform high complexity image operations in parallel. Similarly, codec functionality may be subsumed with either GPU or CPU operation via software emulation.

In one embodiment, the user interface subsystem may be used to present media to, and/or receive input from, a human user. The user interface subsystem may include physical components (e.g., buttons, keyboards, switches, scroll wheels, etc.) or virtualized components (via a touchscreen). In one exemplary embodiment, the user interface subsystem 1008 may include an assortment of a display, touchscreen, physical buttons, speaker(s), and a microphone.

In one embodiment, the network/data interface subsystem may be used to receive data from, and/or transmit data to, other devices. The network/data interface subsystem may include: wired interfaces, wireless interfaces, and/or removable memory media. In one exemplary embodiment, the network/data interface subsystem 1010 may include network interfaces including, but not limited to: Wi-Fi, Bluetooth, Global Positioning System (GPS), USB, and/or Ethernet network interfaces. Additionally, the network/data interface subsystem 1010 may include removable media interfaces such as: SD cards (and their derivatives) and/or any other optical/electrical/magnetic media (e.g., MMC cards, CDs, DVDs, tape, etc.)

In one embodiment, the network/data interface subsystem may obtain the telemetry data as a track within a media file. For example, the post-processing apparatus may obtain footage from an intermediary device (a cinematic video camera) that includes an audio track with data-over-audio. More generally, the techniques described herein may be broadly generalized to a variety of other applications and/or implementations with equal success; as but one such example, the sink device may directly sample the audio and generate the audio track itself. In such embodiments, the sink device 1000 may additionally include a demodulator 1034 and an analog input 1036. In one such variant, the demodulator 1034 is configured to demodulate trellis coded modulation (TCM) and the analog input 1036 is an audio input channel (AUX IN). During "data-over-audio" operation, an analog electrical waveform is received via the AUX IN; the electrical waveform may be asynchronously sampled according to the sink device's clock (e.g., for recording as an audio media track). Thereafter, the TCM demodulator detects symbols in the sampled data and performs TCM decoding to extract the data-over-audio (described in greater detail below).

In one embodiment, the memory subsystem may be used to store (write) data locally at the sink device 1000. In one exemplary embodiment, data may be stored as non-transitory symbols (e.g., bits read from non-transitory computer-readable mediums.) In one specific implementation, the memory subsystem 1012 is physically realized as one or more physical memory chips (e.g., NAND/NOR flash) that are logically separated into memory data structures. The memory subsystem may be bifurcated into program code 1014 and/or program data 1016. In some variants, program code and/or program data may be further organized for dedicated and/or collaborative use. For example, a multicore GPU and/or CPU system may allocate dedicated memory buffers to facilitate parallelized operation. Similarly, the codec may have a dedicated memory buffer to avoid resource contention.

In one embodiment, the program code includes non-transitory instructions that when executed by the processor subsystem cause the processor subsystem to perform tasks which may include: calculations, and/or actuation of the user interface subsystem and/or network/data interface subsystem. In some embodiments, the program code may be statically stored within the sink device 1000 as firmware. In other embodiments, the program code may be dynamically stored (and changeable) via software updates. In some such variants, software may be subsequently updated by external parties and/or the user, based on various access permissions and procedures.

In one embodiment, the tasks are configured to obtain an analog waveform. In some cases, the analog waveform comprises sampled audio obtained from an intermediary device; for example, a cinematic video camera may sample data-over-audio from a piggybacked action camera. In one specific implementation, the sampled audio is an audio track that is time-aligned to video footage (i.e., both audio and video data are sampled/encoded based on a common reference clock). More generally however, any scheme for obtaining the analog waveform may be substituted with equal success. For example, the analog waveform may be obtained as a separate file structure. Other implementations may stream media tracks according to packetized protocols.

As used herein, the terms "sample", "sampling", and their linguistic derivatives refer to the process of converting a continuously varying physical value (an analog waveform) into discrete values. The Nyquist rate is the minimum sampling rate necessary to preserve signal fidelity; sampling below the Nyquist rate can introduce aliasing issues, etc. The Nyquist rate is twice the highest frequency component of the analog waveform (Nyquist's Theorum). Digital systems often quantize digital samples to a fixed bit width to reduce processing complexity. Bandwidth refers to the bits necessary to reproduce a sampled waveform; bandwidth may be calculated from the sample rate and average (or fixed) bit width.

In one embodiment, the tasks are configured to detect symbols in a sampled waveform. Depending on the shift keying technique, different detectors may be used and/or combined. For example, an amplitude shift keying (ASK) symbol detector may use envelope detection (e.g., a rectifying circuit in combination with a low pass filter) and/or product detection (e.g., frequency mixer). Frequency shift keying (FSK) may use e.g., quadrature detection, variable frequency mixers, and/or electrical filters. Phase shift keying (PSK) may use a frequency mixer with different phase delay circuitries. Hybrids of the foregoing may be used to accommodate hybridized shift keying schemes. For instance, an envelope detection with variable frequency mixer can be used to demodulate AFSK; similarly, envelope detection with phase detection may be used to demodulate QPSK, 16 QAM, 64 QAM, etc.

In some variants, symbol detection may include time alignment. Time alignment may be based on known transmission structures; for example, the analog waveform may include preamble, midamble, postambles, and/or cyclic prefixes. The transmission structure may clearly delineate the start, the midpoint, or the end of the transmitted data. Still other techniques may incorporate other time information (e.g., user input, external time references, etc.)

In one embodiment, the tasks are configured to decode the symbols to reconstruct a data stream. As noted above, the received symbols may include both information-bearing signal and noise (or non-information bearing symbols). Noise may be introduced from a variety of sources (e.g., cabling losses, misaligned timing, etc.) In one exemplary embodiment, trellis code modulated symbols can be decoded using a corresponding decoder to recover the original data stream. Trellis codes are a subset of convolutional codes, thus virtually any convolutional code may be substituted with equivalent success (e.g., Viterbi ½, Viterbi ⅓, turbo, etc.) Other schemes for signal recovery may also be substituted with equal success (e.g., Hamming codes, Raptor codes, LDPC, etc.)

Once decoded, the data-over-audio may be converted to a telemetry track for use with the video footage. As previously noted, the camera orientation (CORI) may describe translation and/or rotational motion for a first vantage point; thus, in simple implementations, the telemetry track may be directly used. In other cases, the telemetry track may require rotational and/or translational adjustments to account for vantage point differences. For instance, the CORI for an action camera may need a slight adjustment to derive the CORI for a rigidly affixed cinematic video camera. The adjustment may be made calculated with a difference quaternion that accounts for the relative location of the two cameras. The difference quaternion may be inferred from differences in video feeds (e.g., between the action camera and the cinematic video camera); in some cases, the difference quaternion may be derived by visual analysis, in other cases the difference quaternion may be estimated by the user.

In one embodiment, the tasks are configured to store (write) the data into the media file as a time aligned telemetry track. In some embodiments, the telemetry track may additionally be used for post processing. Post-processing techniques are more broadly described within U.S. patent application Ser. No. 16/934,628 entitled "METHODS AND APPARATUS FOR METADATA-BASED PROCESSING OF MEDIA CONTENT" filed Jul. 21, 2020, previously incorporated herein by reference in its entirety.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SOC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A post-processing apparatus, comprising:
a data interface;
a processor subsystem comprising a codec; and
a non-transitory computer-readable medium that stores instructions which when executed by the processor subsystem, causes the post-processing apparatus to:
obtain a media data structure comprising a video track and an audio track captured by a first camera, where the audio track does not preserve phase information;
detect symbols in the audio track;
decode the symbols into telemetry data; and
write a telemetry track within the media data structure based on the telemetry data.

2. The post-processing apparatus of claim 1, where the data interface comprises a removable media interface and the media data structure is obtained from a removable media written to by the first camera.

3. The post-processing apparatus of claim 1, where the processor subsystem comprises a demodulator that is configured to demodulate trellis coded modulation.

4. The post-processing apparatus of claim 1, where the instructions when executed by the processor subsystem, further causes the post-processing apparatus to:
obtain a second video track captured by a second camera;
determine a difference quaternion based on the video track and the second video track;
adjust the telemetry data based on the difference quaternion to create the telemetry track; and
write the telemetry track to the media data structure.

5. The post-processing apparatus of claim 1, where the audio track was captured by the first camera via an analog audio input from a telemetry capture device.

6. The post-processing apparatus of claim 1, where the video track and the audio track have a common reference clock; and where the telemetry track is time-aligned to the video track.

7. A method for decoding data-over-audio, comprising:
obtaining a media data structure comprising a video track and an audio track captured by a first camera, where the audio track comprises symbols sampled concurrent to the video track;
decoding the symbols into telemetry data captured by a second camera, where the telemetry data comprises camera orientation data and image orientation data; and
storing a telemetry track to the media data structure based on the telemetry data.

8. The method of claim 7, where decoding the symbols comprises de-mapping the symbols based on an amplitude frequency shift keying constellation.

9. The method of claim 7, where decoding the symbols comprises convolutionally decoding the symbols based on a trellis coded modulation.

10. The method of claim 7, further comprising determining a difference quaternion between the first camera and the second camera; and
adjusting the telemetry data based on the difference quaternion to create the telemetry track.

11. The method of claim 7, further comprising stabilizing the video track based on the image orientation data.

12. The method of claim 7, where the media data structure further comprises a scratch audio track captured by the first camera.

13. A post-processing apparatus, comprising:
a data interface;
a processor subsystem; and
a non-transitory computer-readable medium that stores instructions which when executed by the processor subsystem, causes the post-processing apparatus to:
obtain amplitude frequency shift keyed symbols that were sampled concurrently with a first video track;
decode the amplitude frequency shift keyed symbols into telemetry data; and
write a media data structure having a common reference clock, where the media data structure is based on the first video track and the telemetry data.

14. The post-processing apparatus of claim 13, where the processor subsystem comprises a demodulator that is configured to demodulate trellis coded modulation.

15. The post-processing apparatus of claim 13, where the processor subsystem comprises a codec and where the amplitude frequency shift keyed symbols do not preserve phase information.

16. The post-processing apparatus of claim 13, where the data interface comprises an analog audio input and the amplitude frequency shift keyed symbols are obtained via the analog audio input.

17. The post-processing apparatus of claim 13, where the data interface comprises a network interface and the amplitude frequency shift keyed symbols are obtained via the network interface.

18. The post-processing apparatus of claim 13, where the first video track was captured with a first camera and a second video track was concurrently captured with the first video track by a second camera.

19. The post-processing apparatus of claim 18, where the instructions further cause the post-processing apparatus to determine a difference quaternion based on the first video track and the second video track and adjust the telemetry data based on the difference quaternion to create a telemetry track.

* * * * *